R. H. DIETRICH AND T. L. HIBBARD.
AUXILIARY AUTOMOBILE SEAT.
APPLICATION FILED JULY 22, 1920.
1,369,633.
Patented Feb. 22, 1921.
2 SHEETS—SHEET 1.
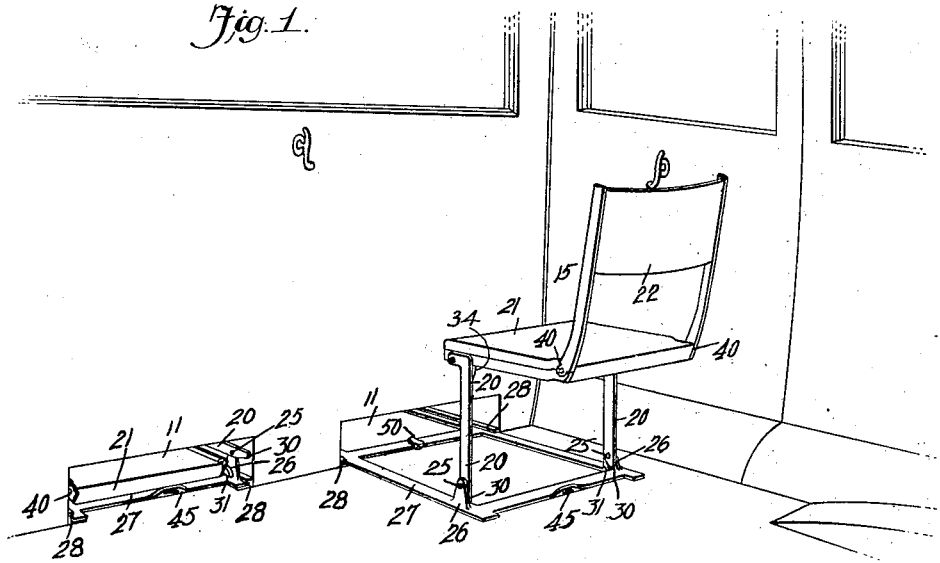
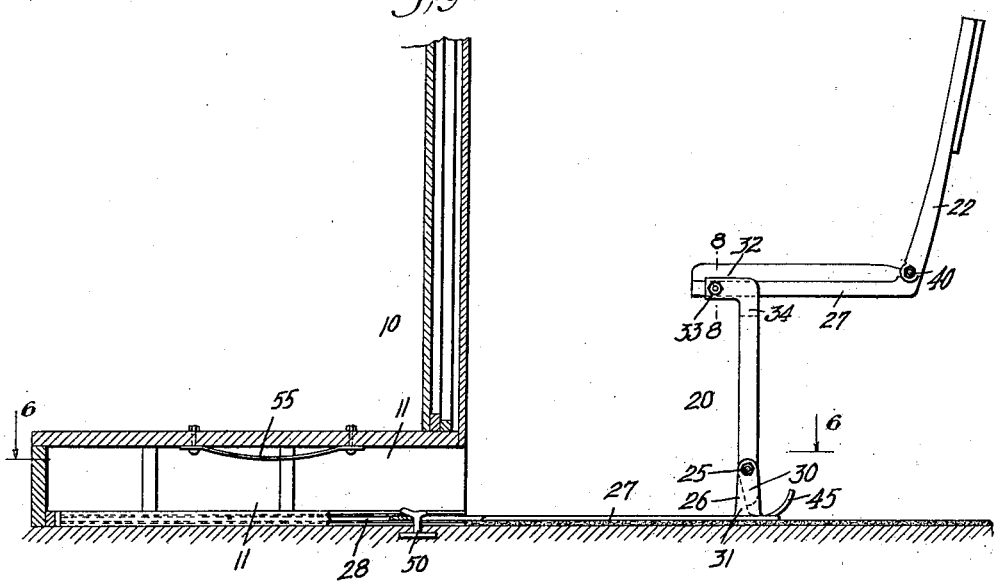
WITNESSES
INVENTORS
RAYMOND H. DIETRICH
THOMAS L. HIBBARD
BY
ATTORNEYS R. H. DIETRICH AND T. L. HIBBARD.
AUXILIARY AUTOMOBILE SEAT.
APPLICATION FILED JULY 22, 1920.
1,369,633.
Patented Feb. 22, 1921.
2 SHEETS—SHEET 2.
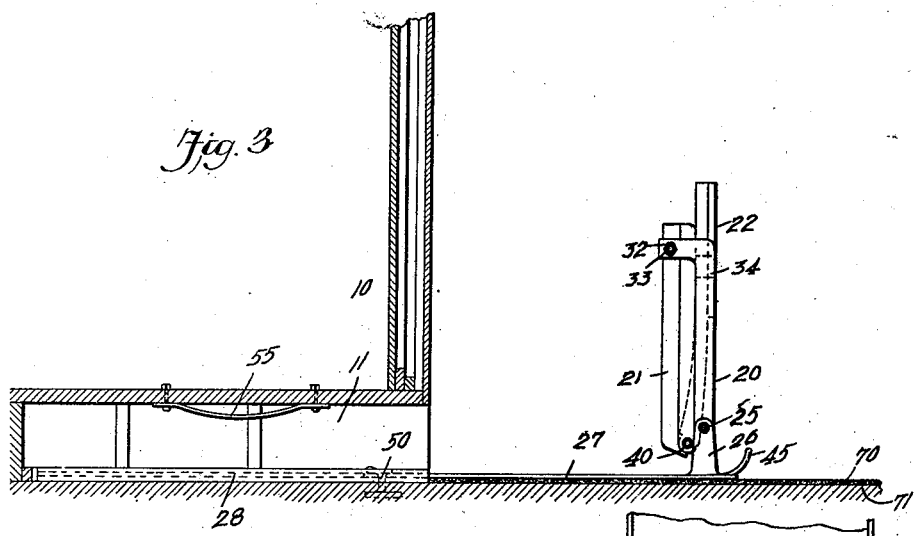
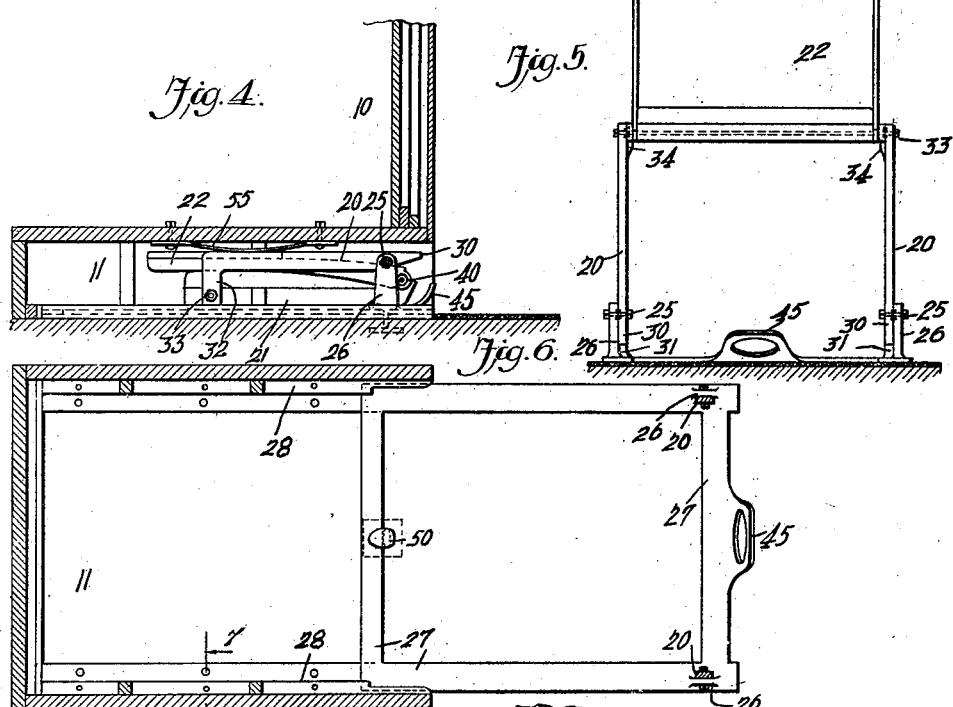

UNITED STATES PATENT OFFICE.

RAYMOND HENRY DIETRICH AND THOMAS LAURENCE HIBBARD, OF NEW YORK, N. Y.

AUXILIARY AUTOMOBILE-SEAT.

1,369,633.  Specification of Letters Patent.  Patented Feb. 22, 1921.

Application filed July 22, 1920. Serial No. 398,081.

*To all whom it may concern:*

Be it known that we, RAYMOND H. DIETRICH and THOMAS L. HIBBARD, both citizens of the United States, and residents, respectively, of the city of New York, South Jamaica, borough of Queens, in the county of Queens and State of New York, and of the city of New York, Corona, borough of Queens, in the county of Queens and State of New York, have invented a new and Improved Auxiliary Automobile-Seat, of which the following is a full, clear, and exact description.

The object of the invention is to provide a new and improved auxiliary automobile seat arranged to permit of conveniently moving it into extended position for use or folding it into compact form and storing it in a comparatively small storage chamber arranged in the front seat of the vehicle.

Another object is to eliminate rattling of the parts of the auxiliary seat when the latter is in folded position.

Another object is to hold the seat against accidental displacement in a longitudinal or a sidewise direction when in extended position.

Another object is to permit of readily fitting the auxiliary seat to the vehicle without change in the construction of the floor framework.

With these and other objects in view, the invention consists of certain novel features of construction, as hereinafter shown and described and then specifically pointed out in the claim.

A practical embodiment of the invention is represented in the accompanying drawings forming a part of this specification, in which similar characters of reference indicate corresponding parts in all the views.

Figure 1 is an interior perspective view of a portion of an automobile provided with two auxiliary automobile seats, of which one is shown in extended position and the other is in folded stored position;

Fig. 2 is an enlarged sectional side elevation of the same and showing one seat in extended position ready for use;

Fig. 3 is a similar view of the same with the auxiliary seat partly folded;

Fig. 4 is a like view of the same with the auxiliary seat in folded and stored position;

Fig. 5 is a rear end elevation of one of the seats in extended position and showing the floor in section;

Fig. 6 is a sectional plan view of the auxiliary automobile seat on the line 6—6 of Fig. 2;

Fig. 7 is an enlarged cross section of one side of the guideway in the storage chamber, the section being on the line 7—7 of Fig. 6; and Fig. 8 is a cross section of the hinged connection between the uprights and the seat, the section being on the line 8—8 of Fig. 2.

The front seat 10 of an automobile or other vehicle is preferably provided with two storage chambers 11, each open at its rear end and adapted to receive an auxiliary folding seat 15, as hereinafter more fully explained. Each folding seat 15 comprises essentially uprights 20 and a seat 21 which is preferably provided at its rear end with a foldable back 22 but such back may be omitted if desired. The uprights 20 are connected by pivots 25 with lugs 26 rising integrally from the sides of a rectangular base frame 27 having its sides mounted to slide in guideways 28 arranged in the bottom of the corresponding storage chamber 11. Each upright 20 is provided with a heel 30 adapted to abut against a projection or a stop 31 formed integrally on the inner face of the corresponding lug 26 to limit the upward swinging movement of the upright 20 and to hold the upright 20 against rearward swinging movement after reaching a vertical position. The upper end of each upright 20 is provided with a forwardly extending angular arm 32 connected by a pivot 33 with the forward portion of the seat 21, and the said upper end of each upright 20 is provided below the arm 32 with an integral support 34 for the corresponding side of the seat to rest on when in the extended horizontal position shown in Figs. 1, 2 and 5. It will be noticed that when the automobile seat 15 is in extended position and a person is seated on the seat 21 then the latter is firmly supported by the uprights 20 and the latter are held securely in upright position by the heels 30 abutting against the projections 31 thus preventing the seat from accidentally collapsing. The back 22 is connected by a pivot 40 to the sides of the seat 21 at the rear end thereof, and the joint between the back and seat is preferably a rule joint to hold the back 22 inclined upwardly and rearwardly and to allow of swinging the said back downwardly and forwardly onto the seat 21.

The seat 21 with the back 22 folded thereon can be swung upward, forward, downward and rearward into an approximately vertical position, as shown in Fig. 3, and then the seat 21 with the back 22 folded thereon can be swung with the uprights 20 downward and forward into a horizontal position on top of the base 27, to be pushed with the latter into the storage chamber 11. In order to permit of conveniently moving the base 27 and the part supported thereon lengthwise on the guideways 28, use is made of a suitable handle 45 formed integrally at the rear crossbar of the base frame 27. To the bottom of the storage chamber 11 near the rear open end thereof is secured a stop 50 extending into the path of the front and rear crossbars of the base frame 27 to limit the rearward and forward sliding movement of the said base frame when moving the auxiliary automobile seat into extended or folded position. To the ceiling of the storage chamber 11 adjacent the sides thereof are secured springs 55 each adapted to bear onto the corresponding upright 20 at the time the automobile seat in folded position is pushed into the storage chamber 11, thus holding the folded auxiliary automobile seat against rattling while stored in the chamber 11. The guideways 28 are preferably provided with linings 60 of fibrous material to insure easy movement of the base frame 27 and to prevent rattling of the same in the guideways.

It will be noticed that by the arrangement described the seat 15 can be folded into a comparatively small space thus requiring a correspondingly low storage chamber 11 in the front seat 10 of the automobile.

It will further be noticed that the guideways 28 support the base frame 27 flush with the carpet 70, usually covering the floor 71 of the automobile and hence when the base frame 27 is in rearmost withdrawn position it rests on the said carpet, except the forward portion which remains in engagement with the guideways 28 owing to the limiting stop 50.

Having thus described our invention, we claim as new and desire to secure by Letters Patent:—

A folding seat, comprising a base, spaced uprights pivoted thereon and provided at their upper ends with seat supports and with forwardly extending angular arms, a seat pivoted on the said angular arms and adapted to rest on the said seat supports and a back pivoted on the said seat, the pivotal connections between the said parts being arranged to allow the said back to swing from extended position downward and forward onto the said seat, the latter with the back folded thereon being adapted to swing from extended position upward and forward and then downward and rearward to fold onto the said upright, and the latter with the seat and back in folded position thereon being adapted to swing forward and downward with the said parts in an approximately horizontal position.

RAYMOND HENRY DIETRICH.
THOMAS LAURENCE HIBBARD.